US011969065B2

(12) United States Patent
Madara et al.

(10) Patent No.: US 11,969,065 B2
(45) Date of Patent: Apr. 30, 2024

(54) CASE FOR GLASSES

(71) Applicant: THE SUN AND STAR COLLECTIVE LLC, Media, PA (US)

(72) Inventors: Emily Ann Madara, Solebury, PA (US); Caroline Elise O'Keefe, Media, PA (US)

(73) Assignee: THE SUN AND STAR COLLECTIVE LLC, Media, PA (US)

( * ) Notice: Subject to any disclaimer, the term of this patent is extended or adjusted under 35 U.S.C. 154(b) by 0 days.

(21) Appl. No.: 18/160,607

(22) Filed: Jan. 27, 2023

(65) Prior Publication Data

US 2023/0255333 A1 Aug. 17, 2023

Related U.S. Application Data

(60) Provisional application No. 63/311,075, filed on Feb. 17, 2022.

(51) Int. Cl.
*A45C 11/04* (2006.01)
*H01J 49/14* (2006.01)

(52) U.S. Cl.
CPC ............ *A45C 11/04* (2013.01); *H01J 49/145* (2013.01)

(58) Field of Classification Search
CPC ........... A45C 11/04; A45C 11/06; H01J 49/14
USPC ...................................... 206/5; 220/230, 504
See application file for complete search history.

(56) References Cited

U.S. PATENT DOCUMENTS

| | | | | | |
|---|---|---|---|---|---|
| 879,635 | A * | 2/1908 | Harris | B65D 1/04 | 220/504 |
| 1,706,334 | A * | 3/1929 | Toch | B44D 3/122 | 206/219 |
| 3,000,417 | A * | 9/1961 | Goldstein | A45C 11/04 | D3/265 |
| 3,144,127 | A * | 8/1964 | Fogel | A45C 11/04 | 206/5 |
| 3,961,721 | A * | 6/1976 | Gordon | B65D 43/169 | 220/837 |

FOREIGN PATENT DOCUMENTS

AU 2012216561 A1 * 3/2013

OTHER PUBLICATIONS

CN 202890871, Zheng ,J, "Glasses Box Cover . . . " Apr. 2013 (Year: 2013).*
CN 209825496, Liang, Z, "Common Glasses . . . Carry Case", Dec. 2019 (Year: 2019).*

(Continued)

*Primary Examiner* — Bryon P Gehman
(74) *Attorney, Agent, or Firm* — McCarter & English, LLP

(57) ABSTRACT

Exemplary embodiments are directed to a case for storing two pairs of glasses. The case can include an inner wall including opposing first and second edges, a first endcap positioned adjacent to the first edge of the inner wall, and a second endcap positioned adjacent to the second edge of the inner wall. The case can include a first outer wall extending from the first endcap to the second endcap, and a second outer wall extending from the first endcap to the second endcap. The first and second endcaps, and the first and second outer walls define an enclosure. The inner wall separates the enclosure into two independent compartments.

18 Claims, 9 Drawing Sheets

(56) References Cited

OTHER PUBLICATIONS

M-world, Double Glasses Case Aluminum Hard Shell Black for Men, Women, Amazon (available at) https://www.amazon.com/Double-Glasses-Aluminum-Reading-Sunglasses/dp/B01M5DQX6W/ref=sr_1_21?gclid=CjwKCAiA2rOeBhAsEiwA2PI7Qz6urgzSwEP3gdC4XxNirFsefKYbJU2BKscxGvZa7EA459SfYg66ihoC_mIQAvD_BwE&hvadid=570455457339&hvdev=c&hvlocphy=9007195&hvnetw=g&hvqmt=b&hvrand=6932518013714132467&hvtargid=kwd-297901354001&hydadcr=7253_13207853&keywords=eyeglass%2Bdouble%).

Agent248, Eyeglass and Sunglass 2-Compartment Travel Case for Men and Women, Amazon (available at https://www.amazon.com/Eyeglass-Sunglass-2-Compartment-Travel-Case/dp/B09BLKVBNJ/ref=sr_1_54?gclid=CjwKCAiA2rOeBhAsEiwA2PI7Qz6urgzSwEP3gdC4XxNirFsefKYbJU2BKscxGvZa7EA459SfYg66ihoC_mIQAvD_BwE&hvadid=570455457339&hvdev=c&hvlocphy=9007195&hvnetw=g&hvqmt=b&hvrand=6932518013714132467&hvtargid=kwd-297901354001&hydadcr=7253_13207853&keywords=eyeglass%2Bdouble%).

* cited by examiner

CASE FOR GLASSES

CROSS-REFERENCE TO RELATED APPLICATIONS

This application claims the benefit of U.S. Provisional Patent Application No. 63/311,075, which was filed on Feb. 17, 2022. The entire content of the foregoing provisional application is incorporated herein by reference.

TECHNICAL FIELD

The present disclosure relates to a case for glasses and, in particular, to a case capable of simultaneously holding two pairs of glasses in a compact and separate manner.

BACKGROUND

About 75% of adults worldwide rely on some form of vision correction, which inevitably results in the need for prescription eyeglasses. Individual eyeglass cases are generally used for storage of the eyeglasses to prevent potential damage to the eyeglasses when not in use. If an individual owns more than one pair of eyeglasses, each pair of eyeglasses is typically stored in its own respective case. When stored at home, having multiple cases can result in difficult in locating the appropriate pair of eyeglasses. When traveling outside of the home, carrying multiple cases can be an inconvenience to the individual due to the bulkiness of traditional eyeglass cases. Further, individuals may own one or more pairs of sunglasses, which adds to the number of cases needed for storage.

Thus, a need exists for a case for glasses that provides for convenient and compact storage of two pairs of glasses. These and other needs are addressed by the case for glasses of the present disclosure.

SUMMARY

In accordance with embodiments of the present disclosure, an exemplary case for storage of two pairs of glasses is provided. The case includes a rigid internal frame structure configured to provide protection to the glasses stored within the case, and an at least partially flexible outer cover for selectively opening and closing access to storage compartments within the case. The internal frame structure includes a curved inner wall the provides for improved flexibility in storing and/or fitting glasses within the respective compartments. The internal frame structure minimizes the overall dimensions of the case, while ensuring that two pairs of glasses can be comfortably stored within the opposing storage compartments. Magnetic closure can be used to ensure the outer cover panels remain in the closed position for storage. The case therefore provides a convenient and compact means for simultaneously storing two pairs of glasses in a single case.

In accordance with embodiments of the present disclosure, an exemplary case for glasses is provided. The case includes an inner wall including opposing first and second edges, a first endcap positioned adjacent to the first edge of the inner wall, and a second endcap positioned adjacent to the second edge of the inner wall. The case includes a first outer wall extending from the first endcap to the second endcap, and a second outer wall extending from the first endcap to the second endcap. The first and second endcaps, and the first and second outer walls define an enclosure. The inner wall separates the enclosure into two independent compartments.

Each of the two independent compartments is configured and dimensioned to receive a pair of glasses. The opposing first and second edges of the inner wall can define a substantially S-shaped configuration. The inner wall defines an S-shaped curvature from the first edge to the second edge complementary to the S-shaped configuration. In some embodiments, the first and second endcaps can each include an inwardly facing surface with a wall extending therefrom. The wall can include a groove configured to at least partially receive the respective first or second edge of the inner wall. The groove defines an S-shaped configuration complementary to an S-shaped configuration of the inner wall. A similar tongue and groove arrangement can be used for engagement of the first and second outer walls with the respective endcaps.

The inner wall and the first and second outer walls are secured on opposing ends to the respective first and second endcaps. The case includes one or more magnets disposed at or near side edges of the first and second outer walls. The case can include a first outer cover secured to an outer surface of the first endcap, and a second outer cover secured to an outer surface of the second endcap. In some embodiments, the first and second outer covers can be fabricated from fabric or leather.

The first and second outer walls each extend radially less than about 180 degrees to define first and second openings between an edge of the first and second outer walls and the inner wall. In some embodiments, the first outer wall and the second outer wall each define a radial extension of between 75-100 degrees, inclusive. The first and second openings extend into the respective two independent compartments. The case can therefore include first and second openings formed between the first and second outer walls and the inner wall, the first and second openings providing access to the respective two independent compartments. The first and second openings are disposed on opposing sides of the case (e.g., orientated about 180 degrees from each other.

The case can include a first panel secured to the first outer wall and a second panel secured to the second outer wall. The first panel includes a section movable relative to the first outer wall to selectively open and close the first opening, and the second panel includes a section movable relative to the second outer wall to selectively open and close the second opening. The first and second panels can include a ferromagnetic material incorporated therein and configured to engage with a corresponding magnetic material of the respective first and second outer walls to maintain the first and second panels in a closed position. It should be understood that the position of the ferromagnetic and magnetic materials can be interchanged.

In accordance with embodiments of the present disclosure, an exemplary method of glasses storage is provided. The method includes securing a first endcap to a first edge of an inner wall, and securing a second endcap to an opposing second edge of the inner wall. The method includes securing first and second outer walls to the first and second endcaps such that the first and second outer walls extending from the first endcap to the second endcap. The first and second endcaps, and the first and second outer walls define an enclosure. The inner wall separates the enclosure into two independent compartments.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed case for glasses, reference is made to the accompanying figures, wherein.

DETAILED DESCRIPTION

FIGS. 1-7 are perspective, side, front, top, cross-sectional, detailed and exploded views of a case 100 (hereinafter "case 100") for storing glasses that provides a convenient and compact means for storing two pairs of glasses. As discussed herein, it should be understood that the term "glasses" refers to both prescription eyeglasses, as well as sunglasses. For example, the case 100 can accommodate two pairs of eyeglasses, two pairs of sunglasses, or one pair of eyeglasses and one pair of sunglasses. The pairs of glasses are stored in their respective compartments and are separated from each other by an inner wall of the case 100.

The case 100 generally includes an inner rigid shell/frame structure and an exterior/outer fabric or leather cover secured to the shell/frame structure. The inner shell/frame structure of the case 100 includes a primary inner wall 102 that extends the length of the case 100 between two opposing endcaps 104, 106 assembled with the inner wall 102. In some embodiments, the inner wall 102 can be fabricated from a rigid or hard plastic. The inner wall 102 acts to separate the interior of the case 100 into two individual compartments 108, 110 that are each configured and dimensioned to receive a pair of glasses. In some embodiments, surfaces of the inner wall 102 to be positioned against the glasses can be covered in a fabric or leather material to prevent/reduce damage of the glasses. In some embodiments, the compartments 108, 110 can be equally dimensioned. In some embodiments, the dimensions (e.g., volume) of the compartments 108, 110 can be different.

Figure 1:
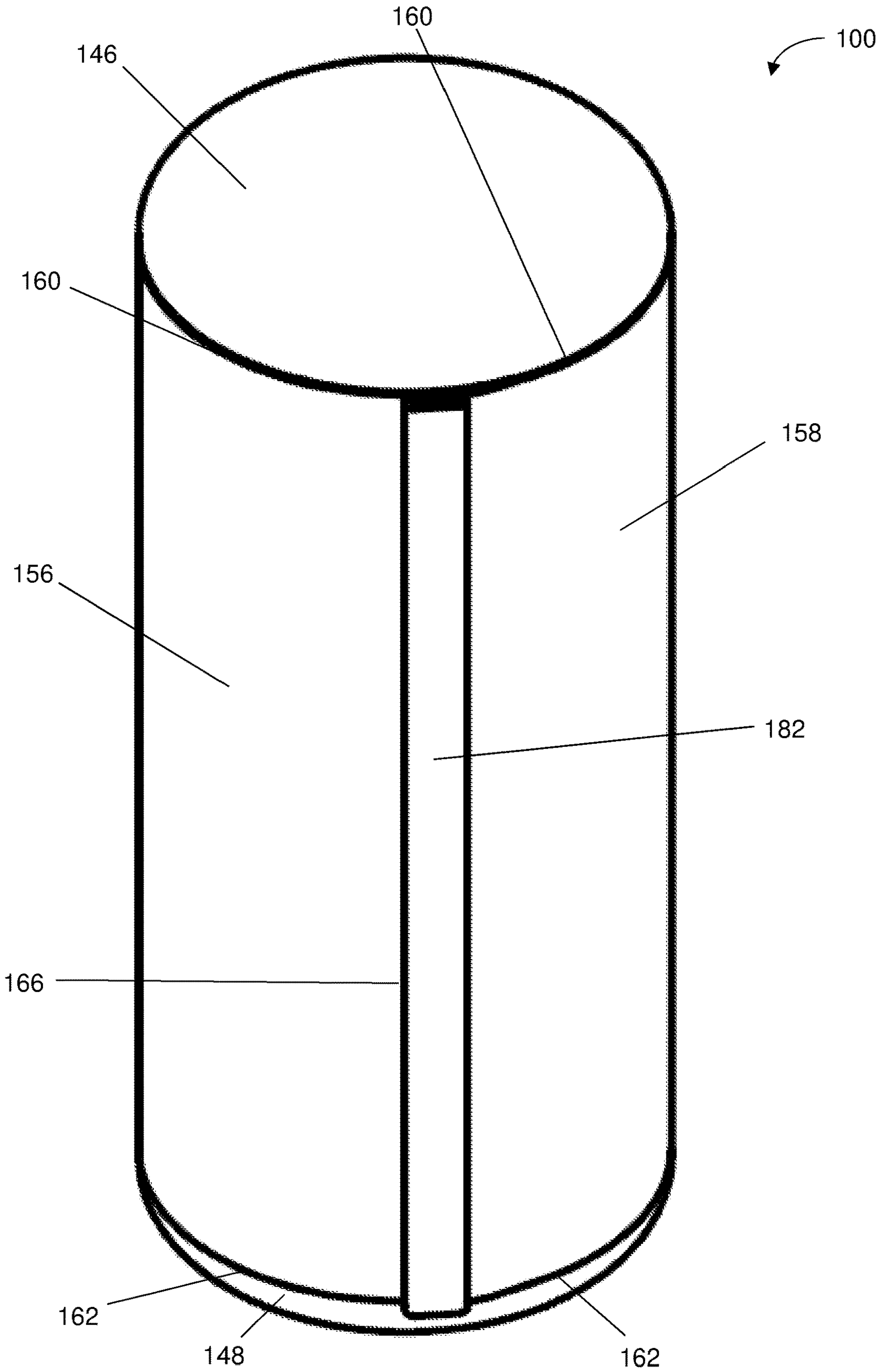
FIG. 1 is a perspective view of a case for glasses according to the present disclosure.
Figure 2:
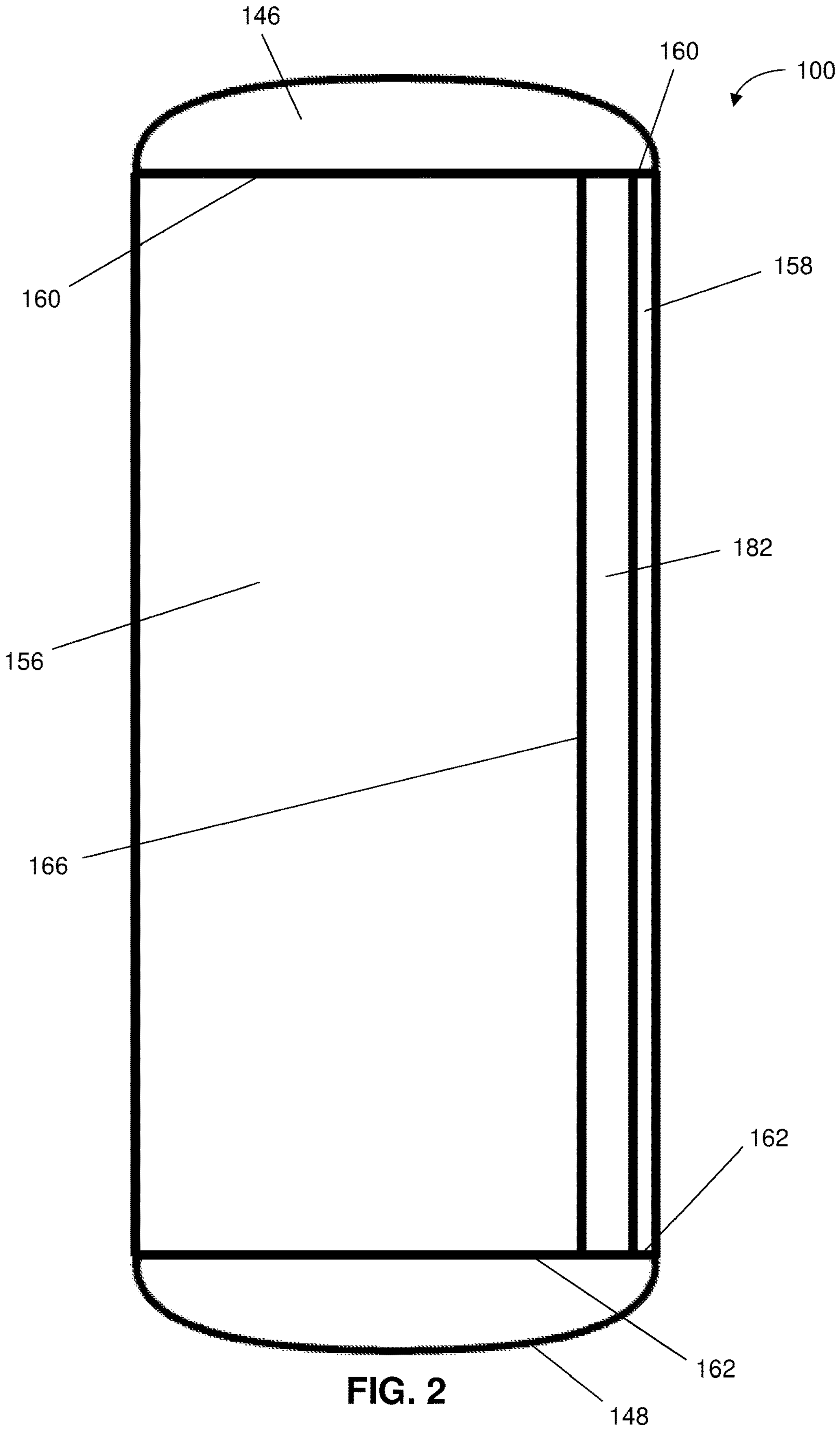
FIG. 2 is a side view of a case for glasses of FIG. 1.
Figure 3:
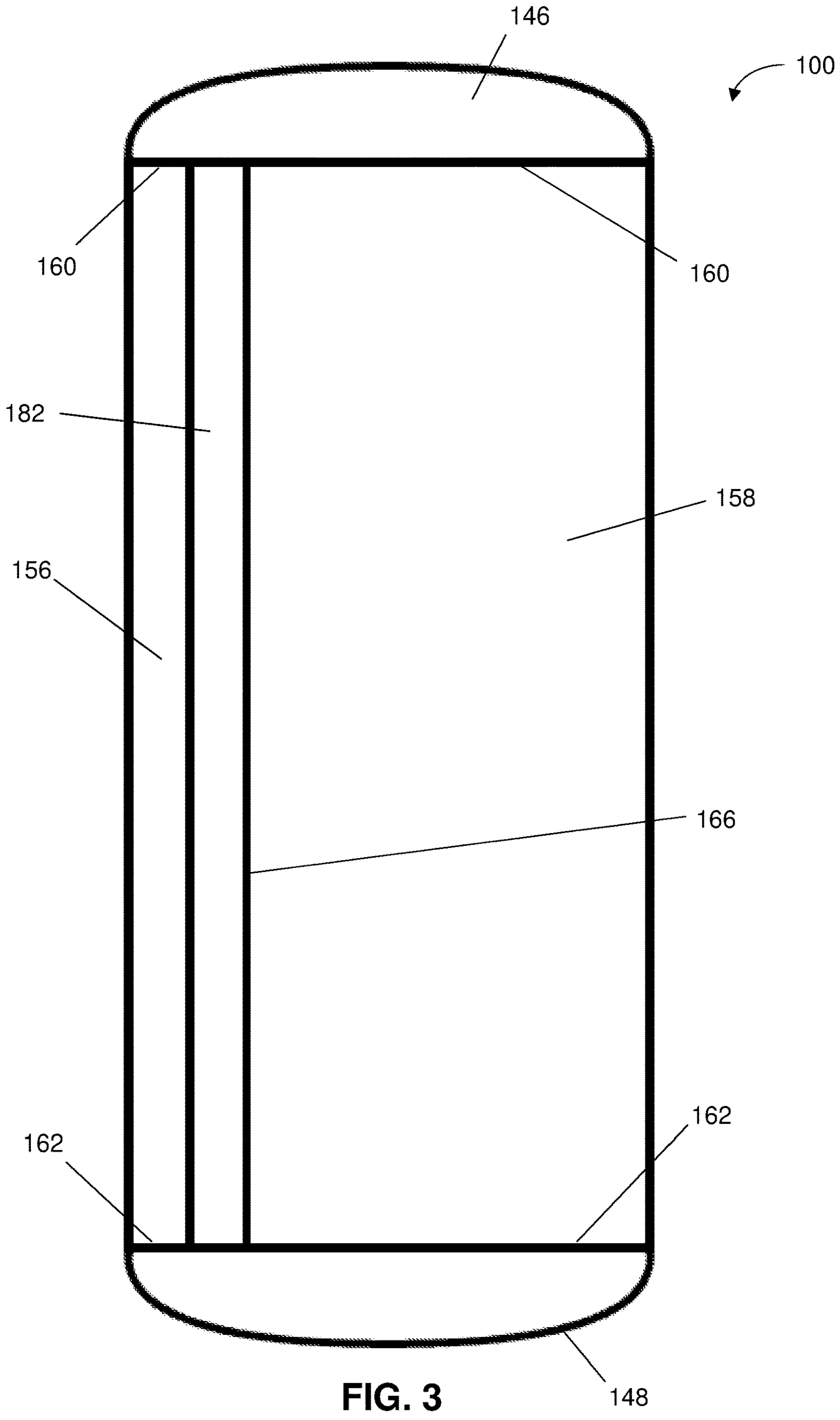
FIG. 3 is a front view of a case for glasses of FIG. 1.
Figure 4:
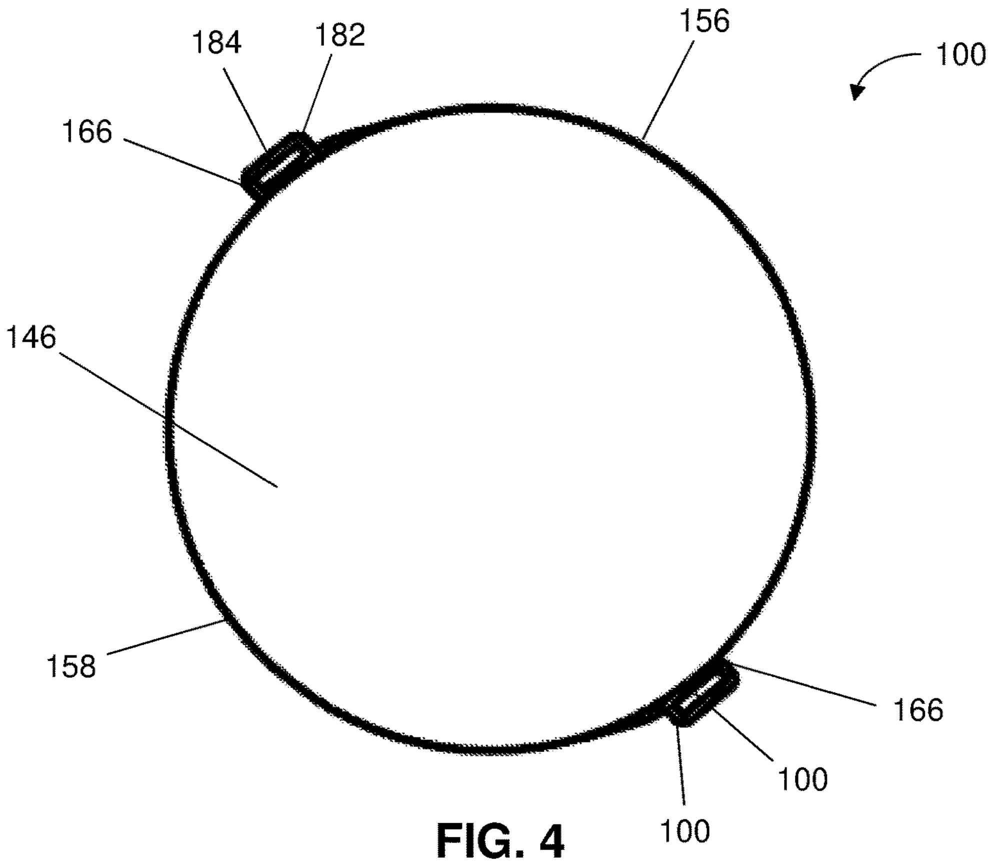
FIG. 4 is a top view of a case for glasses of FIG. 1.
Figure 5:
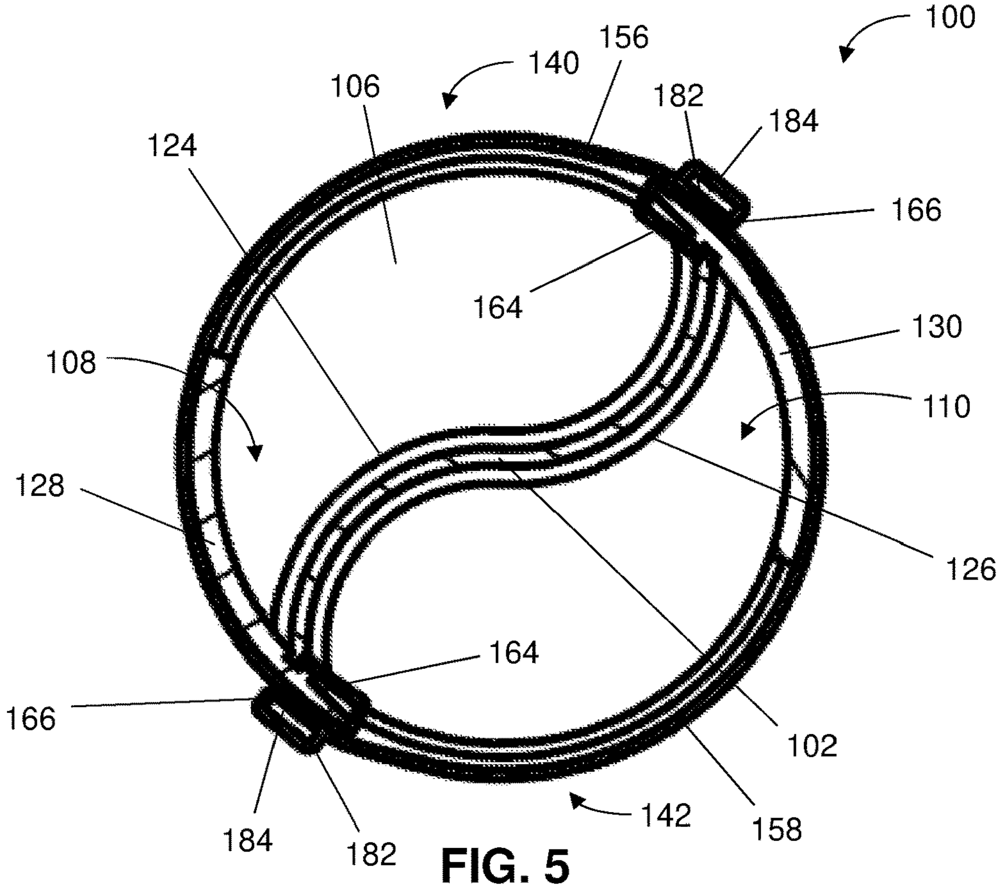
FIG. 5 is a cross-sectional, top view of a case for glasses of FIG. 1.
Figure 6:
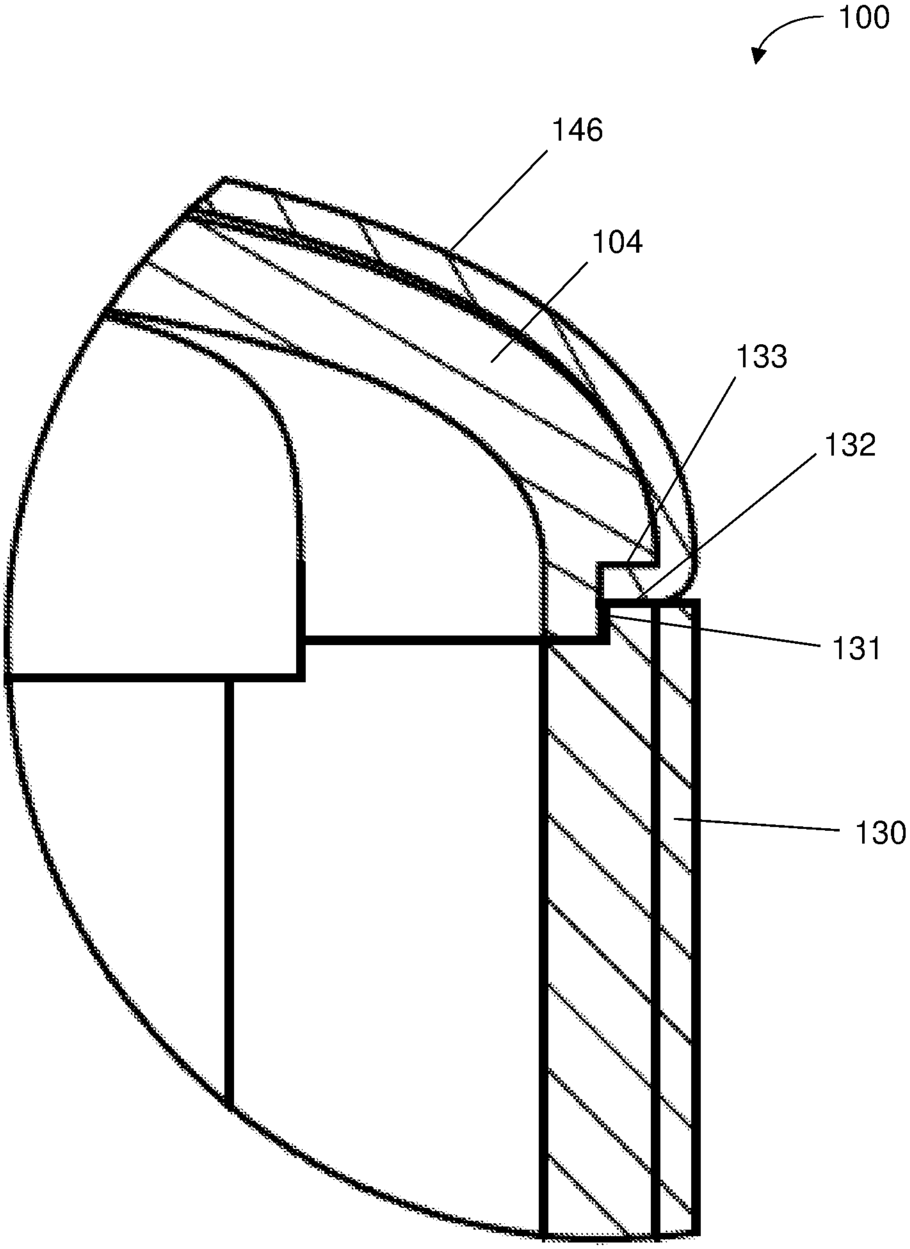
FIG. 6 is a detailed, cross-sectional view of a case for glasses of FIG. 1.
Figure 7:
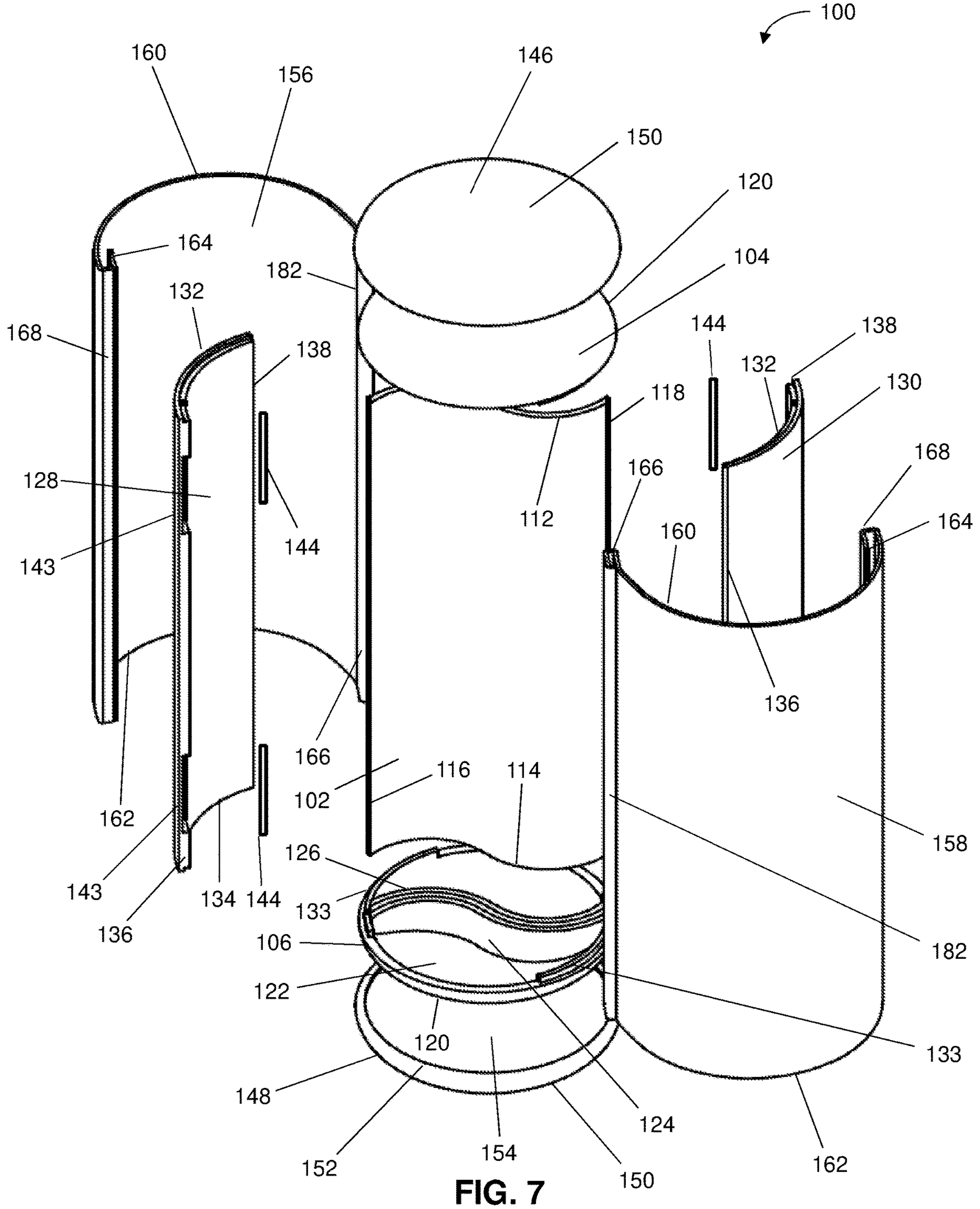
FIG. 7 is an exploded, perspective view of a case for glasses of FIG. 1.

The inner wall 102 includes opposing top and bottom edges 112, 114 and opposing side edges 116, 118 that extend substantially perpendicularly relative to each other. The side edges 116, 118 extend in a generally linear manner (i.e., no curvature), which the top and bottom edges 112, 114 each extend in a curved manner. In some embodiments, the top and bottom edges 112, 114 each define a substantially S-shaped configuration. As illustrated in FIGS. 5 and 7, the S-shaped configuration of the top and bottom edges 112, 114 results in a corresponding curvature of the inner wall 102 along the entire height of the inner wall 102 extending between the top and bottom edges 112, 114. The inner wall 102 therefore defines a substantially rectangular configuration with an S-shaped curvature. The thickness of the inner wall 102 remains uniform along the entire top to bottom edge 112, 114 and side to side edge 116, 118 directions. The curvature of the inner wall 102 results in compartments 108, 110 that are shaped to more conveniently receive a pair of glasses. In particular, rather than a planar extension of the inner wall that may result in difficultly in fitting glasses within the case 100, the curvature of the inner wall 102 provides for flexibility and/or additional space in accommodating the glasses within each respective compartment 108, 110. The curved inner wall 102 essentially redistributes the volume provided in each compartment 108, 110 in such a way that accommodates glasses in an improved manner.

The case 100 includes a first endcap 104 (e.g., a top endcap) and a second endcap 106 (e.g., a bottom endcap) secured to opposing top and bottom edges 112, 114 of the inner wall 102. The endcaps 104, 106 can be fabricated from the same material as the inner wall 102 (e.g., a hard plastic) to provide rigidity to the ends of the case 100. In some embodiments, the endcaps 104, 106 can each define a substantially circular configuration. The outwardly facing surface 120 of the endcaps 104, 106 can define a planar or convex shape (e.g., an outwardly curved surface). The inwardly facing surface 122 of the endcaps 104, 106 can define a substantially planar or flat surface. In some embodiments, the inwardly facing surface 122 can define a substantially concave or inwardly curved surface complementary to the convex shape of the outwardly facing surface 120. As discussed herein, the terms inwardly and outwardly facing refer to the relationship of the surfaces relative to the interior of the case 100.

The inwardly facing surface 122 of the endcaps 104, 106 include a coupling structure formed therein for coupling or securing the inner wall 102 to the endcaps 104, 106. The coupling structure includes a wall 124 extending from the inwardly facing surface 122. In some embodiments, the wall 124 can define an S-shaped configuration complementary to the S-shaped curvature of the inner wall 102. In some embodiments, the wall 124 can be substantially linear or planar. The wall 124 includes an inwardly directed groove 126 formed therein. The groove 126 defines an S-shaped configuration complementary to the S-shaped curvature of the inner wall 102, and is dimensioned to receive at least a portion of the respective top and bottom edges 112, 114 of the inner wall 102 (e.g., a tongue and groove arrangement). During assembly, the endcaps 104, 106 can be secured to the opposing edges 112, 114 of the inner wall 102 by press fitting the edges 112, 114 into the grooves 126. In some embodiments, the assembly of the inner wall 102 with the endcaps 104, 106 can be achieved with a friction fit. In some embodiments, adhesive can be used to maintain assembly of the inner wall 102 with the endcaps 104, 106.

The case 100 includes first and second outer walls 128, 130 secured to the endcaps 104, 106 on opposing sides of the case 100. The outer walls 128, 130 can be fabricated from the same material as the inner wall 102 (e.g., a hard plastic) to provide rigidity to the exterior of the case 100, thereby protecting the glasses stored within the case 100. In some embodiments, the inwardly facing surfaces of the walls 128, 130 can include a material or leather to provide for cushioning to the glasses stored within the case 100. Each outer wall 128, 130 includes opposing top and bottom edges 132, 134, and opposing side edges 136, 138 that extend substantially perpendicularly to the top and bottom edges 132, 134. The outer walls 128, 130 therefore define a substantially rectangular configuration, and are curved with a radius matching the radius of curvature of the diameter of the endcaps 104, 106. Thus, both inner and outer surfaces of the walls 128, 130 are curved.

In some embodiments, the radial distance of each of the outer walls 128, 130 as measured between the side edges 136, 138 can be between about, e.g., 75-100 degrees inclusive, 75-95 degrees inclusive, 75-90 degrees inclusive, 75-85 degrees inclusive, 75-80 degrees inclusive, 80-100 degrees inclusive, 85-100 degrees inclusive, 90-100 degrees inclusive, 95-100 degrees inclusive, 80-95 degrees inclusive, 75 degrees, 80 degrees, 85 degrees, 90 degrees, 95 degrees, 100 degrees, 81 degrees, 82 degrees, 81.906 degrees, or the like. In some embodiments, the radial distance of each of the outer walls 128, 130 as measured between the side edges 136, 138 can be between about, e.g., 27-37 mm inclusive, 27-36 mm inclusive, 27-35 mm inclusive, 27-34 mm inclusive, 27-33 mm inclusive, 27-32 mm inclusive, 27-31 mm inclusive, 27-30 mm inclusive, 27-29 mm inclusive, 27-28 mm inclusive, 28-37 mm inclusive, 29-37 mm inclusive, 30-37 mm inclusive, 31-37 mm inclusive, 32-37 mm inclusive, 33-37 mm inclusive, 34-37 mm inclusive, 35-37 mm inclusive, 36-37 mm inclusive, 27 mm, 28 mm, 29 mm, 30 mm, 31 mm, 32 mm, 33 mm, 34 mm, 35 mm, 36 mm, 37 mm, 32.853 mm, or the like. Thus, the outer walls 128, 130 do not extend the full circumferential distance of the case 100, thereby leaving openings 140, 142 into the respective compartments 108, 110 (see, e.g., FIGS. 5, 8 and 9).

Figure 10:
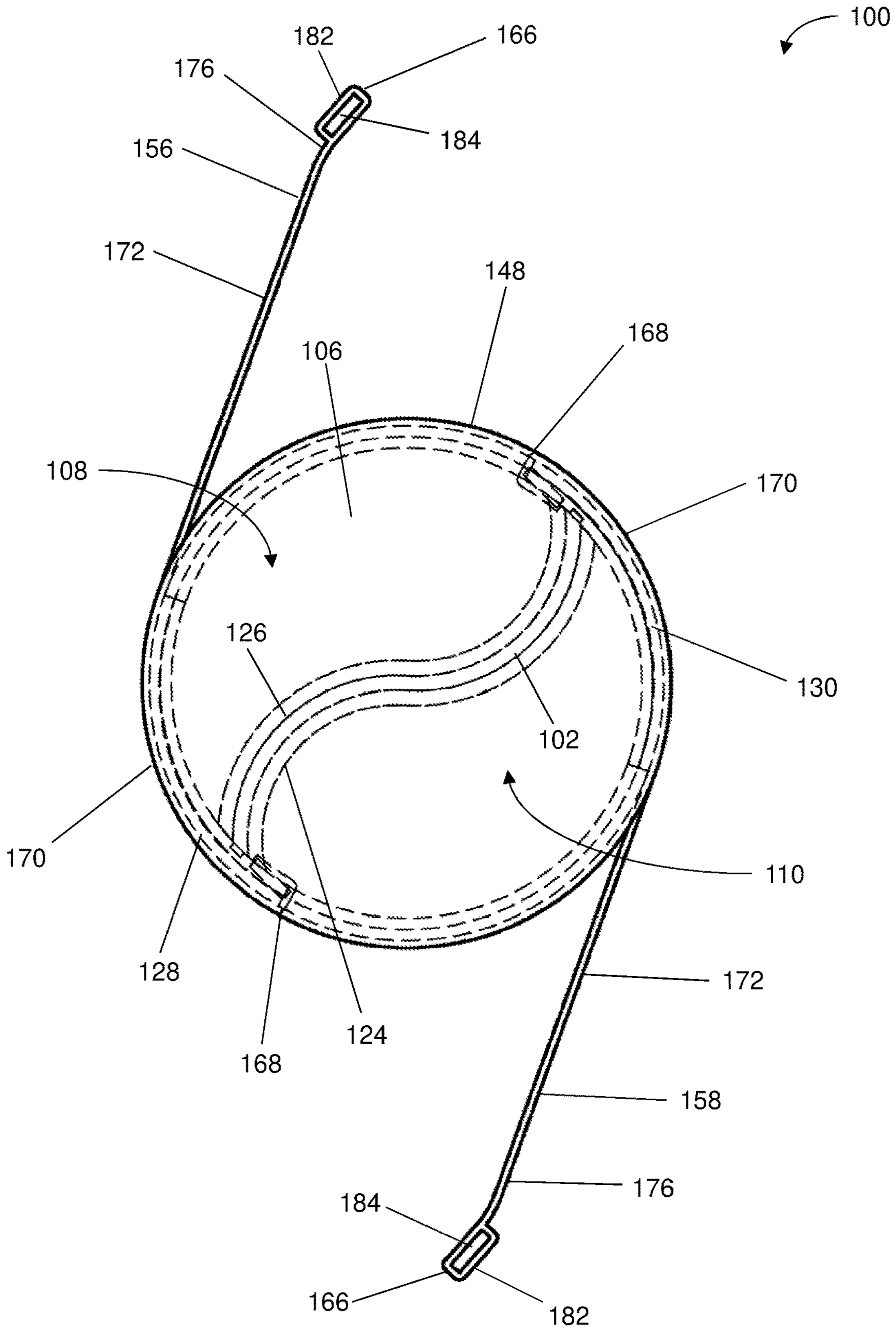
FIG. 10 is a top, transparent view of a case for glasses of FIG. 1 in an open configuration.

During assembly, the top and bottom edges 132, 134 of the outer walls 128, 130 can be press fit into complementary grooves in respective endcaps 104, 106. For example, the endcaps 104, 106 can include a tongue and groove arrangement similar to the one used for assembly with the inner wall 102 to receive the edges 132, 134 of the outer walls 128, 130. Such arrangement can be located along the perimeter of the endcaps 104, 106 to secure one outer wall 128 near the side edge 116 and the other outer wall 130 near the side edge 118 of the inner wall 102. In particular, as illustrated in FIGS. 5 and 10, the outer wall 128 can be coupled to the endcaps 104, 106 such that the side edge 136 is positioned adjacent to or near the side edge 116 of the inner wall 102, and the outer wall 130 can be coupled to the endcaps 104, 106 such that the side edge 138 is positioned adjacent to or near the side edge 118 of the inner wall 102. In some embodiments, the top and bottom edges 132, 134 of the outer walls 128, 130 can include a stepped structure 131 complementary to a stepped structure 133 of the endcaps 104, 106 such that the outer walls 128, 130 can be fixedly engaged with the endcaps 104, 106 (see, e.g., FIGS. 6-7). The outer walls 128, 130 thereby provide rigidity to the outside of the compartments 108, 110, while leaving openings 140, 142 for access to the respective compartments 108, 110. One or more magnets 144 can be secured to the outer walls 128, 130 at or near the edges 136, 138. As will be discussed in greater detail below, the magnets 144 can assist with closure of the exterior cover and/or "door" panels of the case 100. In some embodiments, one of the edges 136, 138 can include a cutout or slot 143 complementary to the magnet 144 such that the magnet 144 can positioned within the slot 143 and adhered to the outer wall 128, 130.

The case includes first and send end covers 146, 148 secured to the outwardly facing surface 120 of the respective endcaps 104, 106. In some embodiments, the end covers 146, 148 can be fabricated from, e.g., a woven fabric, leather, or the like. The end covers 146, 148 can define a substantially circular shape complementary to the endcaps 104, 106 and are intended to cover the entire outwardly facing surface 120 of the endcaps 104, 106. In some embodiments, the end covers 146, 148 can include an outer surface 150, an inwardly curved perimeter edge 152, and an inner surface 154. The perimeter edge 152 can be stretched over the edge of the end covers 146, 148 during assembly. In some embodiments, adhesive can be used to secure the end covers 148, 148 to the endcaps 104, 106.

The case 100 includes exterior covers or panels 156, 158 that are used to both cover the outer walls 128, 130 and function as movable doors to expose the openings 140, 142 for access to the compartments 108, 110. The panels 156, 158 can be fabricated from the same materials as the covers 146, 148. Each panel 156, 158 includes opposing top and bottom edges 160, 162, and opposing side edges 164, 166 that extend substantially perpendicularly relative to each other. The panels 156, 158 therefore define a substantially rectangular configuration with a curvature matching the curvature of the endcap 104, 106 diameter. The panels 156, 158 are dimensioned to extend from the endcap 104 to the endcap 106, and can at least partially overlap onto the covers 148, 148 to ensure both openings 140, 142 are fully closed.

The side edge 164 of the panels 156, 158 can be bent or curved into a hook or U-shaped section 168 to fit around one of the side edges 136, 138 of the outer walls 128, 130 during assembly. Adhesive can be used to secure the section 168 around the respective edge 136, 138 of the outer walls 128, 130. At least a portion of the panels 156, 158 can be secured to the outer surface of the outer walls 128, 130 (e.g., section 170 of FIGS. 8-10), while the remaining portion of the panels 156, 158 (e.g., section 172 of FIGS. 8-10) can be selectively moved or disengaged from the magnets 144 to expose the openings 140, 142.

Prior to assembly with the material and/or leather outer covers, the dimensions of the rigid inner structure can be about, e.g., 170 mm in length (as measured between the outermost edges of the endcaps 104, 106, and about 70 mm in diameter (as measured between the outermost edges of the outer walls 128, 130). After assembly with the material and/or leather outer covers, the dimensions of the case 100 can be about, e.g., 172-174 mm in length (as measured between the outermost edges of the covers 146, 148), and about 72-74 mm in diameter (as measured between the outermost edges of the panels 156, 158). The walls 128, 130 can be about 1.75 inches in radial length (as measured between the edges 136, 138), leaving a gap or opening 140, 142 of about 2 inches in radial length. However, alternative dimensions could be used.

Figure 8:
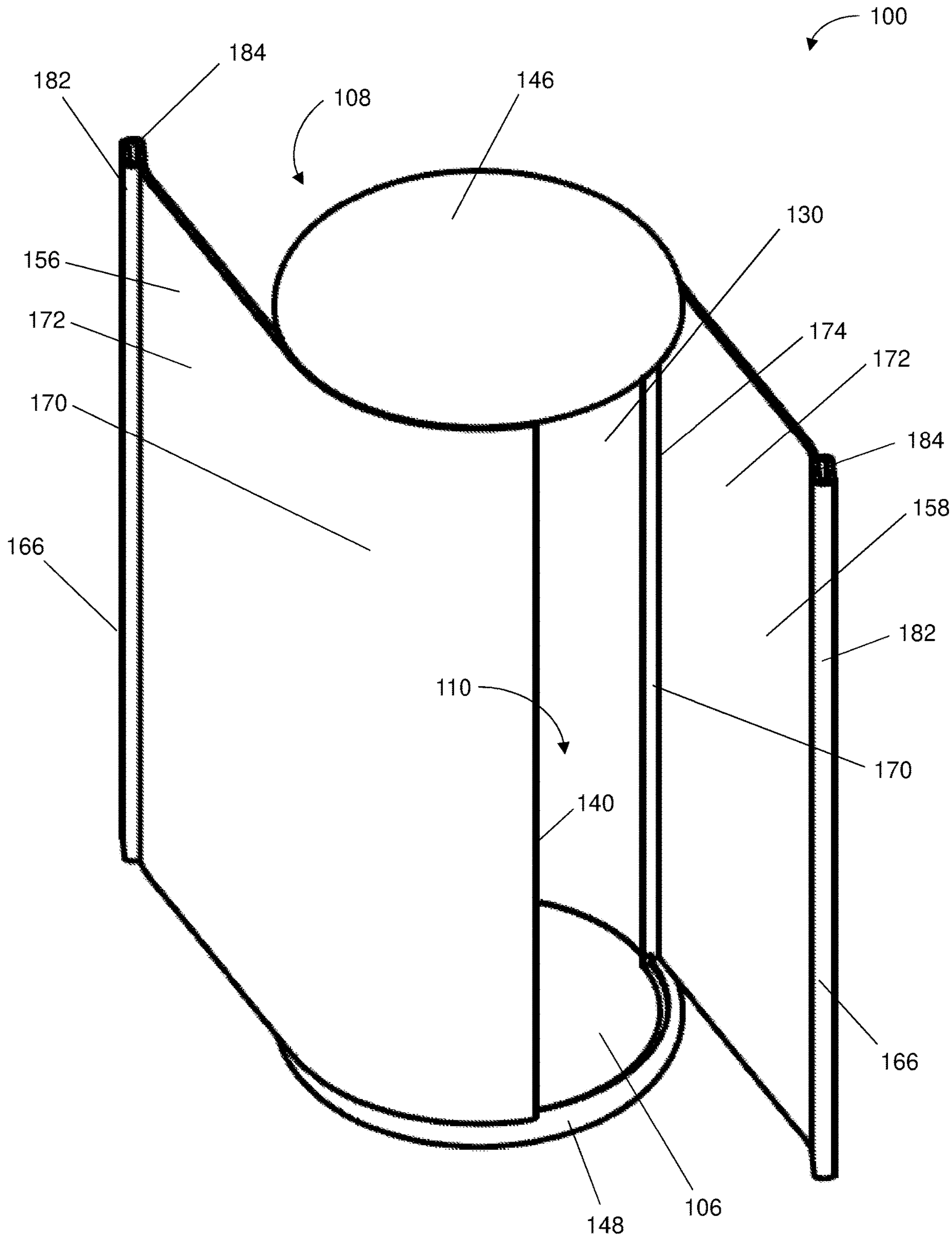
FIG. 8 is a perspective view of a case for glasses of FIG. 1 in an open configuration.
Figure 9:
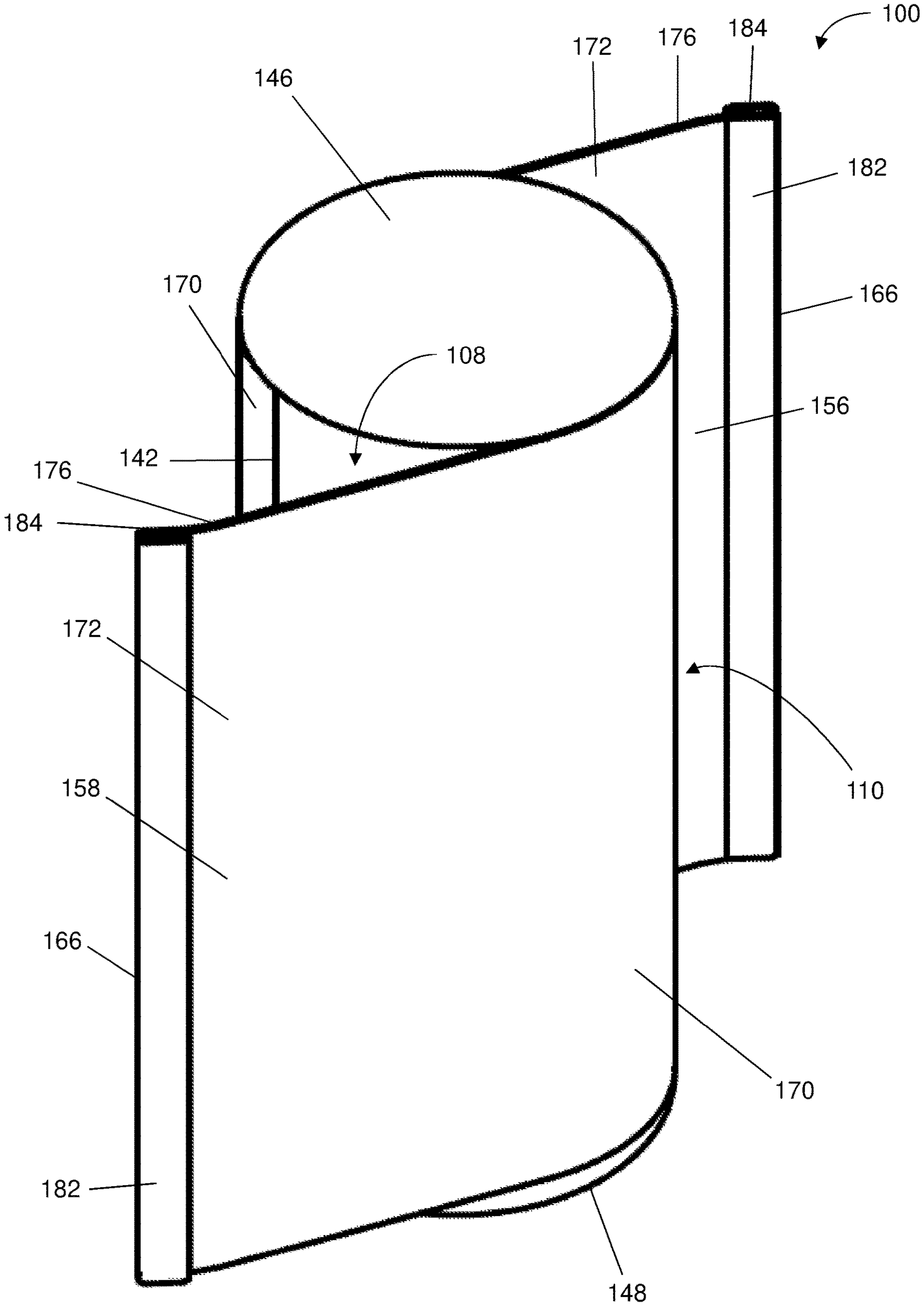
FIG. 9 is a perspective view of a case for glasses of FIG. 1 in an open configuration.

As illustrated in FIGS. 8-10, the panels 156, 158 can include a bend 176 extending from the top edge 160 to the bottom edge 162 such that the edges 166 of the panels 156, 158 face inwardly at a greater angle relative to the remaining curvature of the panels 156, 158. A portion of the panels 156, 158 can be folded backward to form a gripping section 182 at the end of each respective panel 156, 158. The gripping section 182 of the panel 156, 158 between the bend 176 and the edge 166 can serve as a gripping portion for opening and closing the case 100. One or more ferromagnetic materials 184 can be incorporated into the space formed within the gripping section 182 of the panel 156, 158 to correspond with the position of the magnets 144. The ferromagnetic material 184 and the magnets 144 are therefore entirely enclosed within the structure of the case 100, while providing for selective opening and closing of the respective panels 156, 158.

In some embodiments, the ferromagnetic materials 184 can be, e.g., sewn into the panels 156, 158, covered by a fold in the panels 156, 158 (such as the space formed within the gripping section 182), or the like. Thus, when the panels 156, 158 are oriented in the closed position shown in FIGS. 1-6, the ferromagnetic materials 184 engage with the magnets 144 to keep the panels 156, 158 in the closed position. The ferromagnetic material(s) 184 can be disengaged from the magnets 144 to expose the openings 140, 142 into the respective compartments 108, 110. The panels 156, 158 can therefore be used to selectively open and close the case 100 for access to the compartments 108, 110, and the rigid inner structure formed by the inner wall 102, the endcaps 104, 106, and the outer walls 128, 130 ensure secure storage of the glasses. FIGS. 1-6 illustrate the case 100 with the panels 156, 158 in the closed position, while FIGS. 8-10 illustrate the case 100 with both panels 156, 158 in the open position. However, each panel 156, 158 can be independently operated between the open and closed positions as needed by the user.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A case for glasses, comprising:

an inner wall including opposing first and second edges;

a first endcap positioned adjacent to the first edge of the inner wall;

a second endcap positioned adjacent to the second edge of the inner wall;

a first outer wall extending from the first endcap to the second endcap, the first outer wall defining a curved configuration; and a second outer wall extending from the first endcap to the second endcap, the second outer wall defining a curved configuration;

wherein the first and second endcaps, and the first and second outer walls define an enclosure; and wherein the inner wall separates the enclosure into two independent compartments; and wherein the first and second outer walls each extend radially less than 180 degrees of the first and second endcaps to define first and second openings between an edge of the first and second outer walls and the inner wall.

2. The case for glasses of claim 1, wherein each of the two independent compartments is configured and dimensioned to receive a pair of glasses.

3. The case for glasses of claim 1, wherein the opposing first and second edges of the inner wall define an S-shaped configuration.

4. The case for glasses of claim 3, wherein the inner wall defines an S-shaped curvature from the first edge to the second edge complementary to the S-shaped configuration.

5. The case for glasses of claim 1, wherein the first and second endcaps each include an inwardly facing surface with a wall extending therefrom.

6. The case for glasses of claim 5, wherein the wall of the inwardly facing surface of the first endcap includes a first groove configured to at least partially receive the first edge of the inner wall, and wherein the wall of the inwardly facing surface of the second endcap includes a second groove configured to at least partially receive the second edge of the inner wall.

7. The case for glasses of claim 1, wherein the inner wall and the first and second outer walls are secured on opposing ends to the respective first and second endcaps.

8. The case for glasses of claim 1, comprising one or more magnets disposed at or near side edges of the first and second outer walls.

9. The case for glasses of claim 1, comprising a first outer cover secured to an outer surface of the first endcap, and a second outer cover secured to an outer surface of the second endcap.

10. The case for glasses of claim 9, wherein the first and second outer covers are fabricated from fabric or leather.

11. The case for glasses of claim 1, wherein the first outer wall and the second outer wall each define a radial extension of between 75-100 degrees, inclusive.

12. The case for glasses of claim 1, wherein the first and second openings extend into the respective two independent compartments.

13. The case for glasses of claim 1, comprising first and second openings formed between the first and second outer walls and the inner wall, the first and second openings providing access to the respective two independent compartments.

14. The case for glasses of claim 13, wherein the first and second openings are disposed on opposing sides of the case.

15. The case for glasses of claim 13, comprising a first panel secured to the first outer wall and a second panel secured to the second outer wall.

16. The case for glasses of claim 15, wherein the first panel includes a section movable relative to the first outer wall to selectively open and close the first opening, and the second panel includes a section movable relative to the second outer wall to selectively open and close the second opening.

17. The case for glasses of claim 16, wherein the first and second panels include a ferromagnetic material configured to engage with a magnetic material of the respective first and second outer walls to maintain the first and second panels in a closed position.

18. A method of glasses storage, comprising:

securing a first endcap to a first edge of an inner wall, the first outer wall defining a curved configuration;

securing a second endcap to an opposing second edge of the inner wall, the second outer wall defining a curved configuration; and securing first and second outer walls to the first and second endcaps such that the first and second outer walls extending from the first endcap to the second endcap;

wherein the first and second endcaps, and the first and second outer walls define an enclosure;

wherein the inner wall separates the enclosure into two independent compartments, and wherein the first and second outer walls each extend radially less than 180 degrees of the first and second endcaps to define first and second openings between an edge of the first and second outer walls and the inner wall.

* * * * *